June 26, 1956 W. C. KRAUTHEIM 2,751,855
RAILWAY TRUCK SPRING SUPPORT STRUCTURE
Filed Nov. 7, 1952 4 Sheets-Sheet 1

INVENTOR.
William C. Krautheim
BY Rodney Bedell
atty.

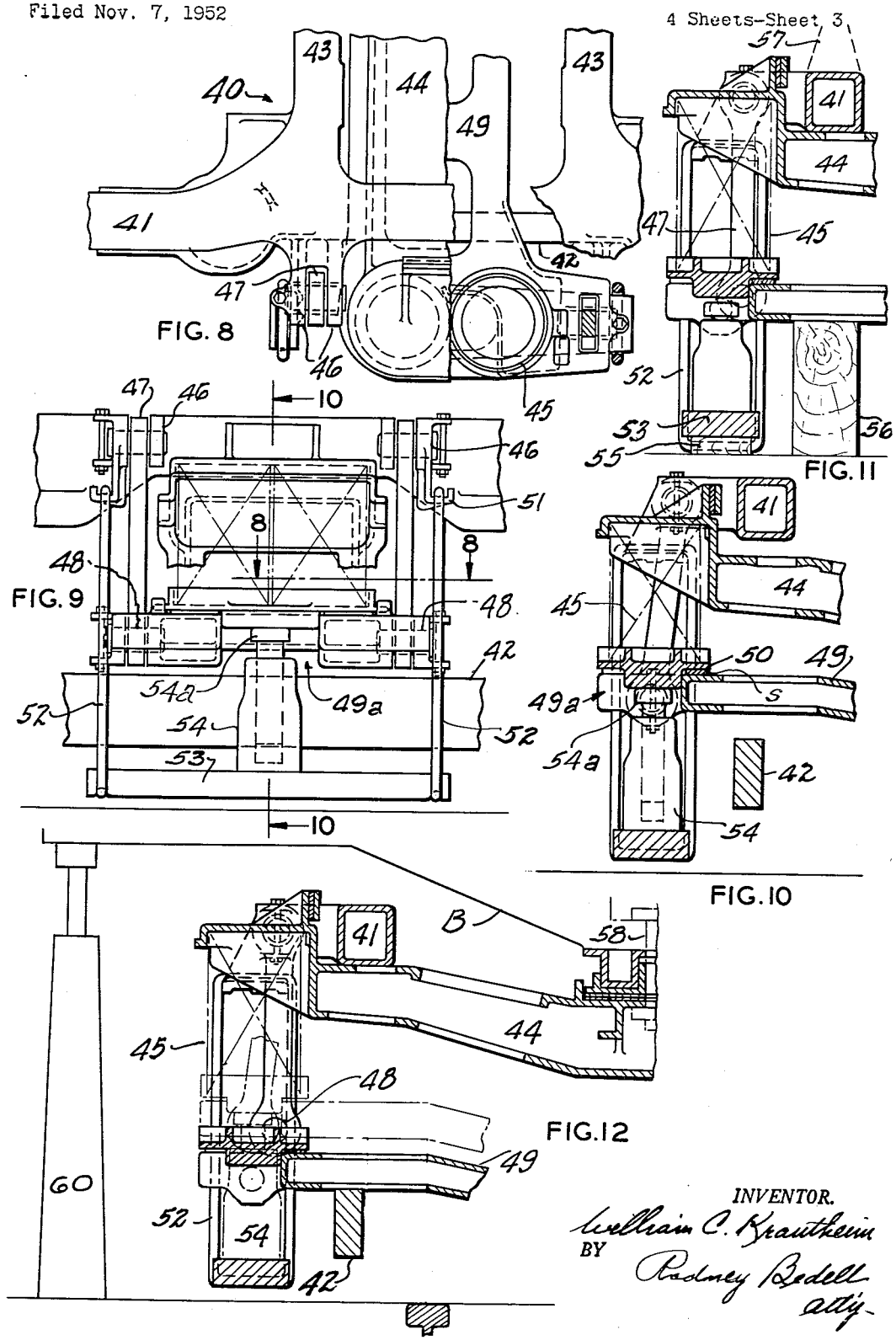

June 26, 1956  W. C. KRAUTHEIM  2,751,855
RAILWAY TRUCK SPRING SUPPORT STRUCTURE
Filed Nov. 7, 1952  4 Sheets-Sheet 4

INVENTOR.
William C. Krautheim
BY Rodney Bedell
atty.

United States Patent Office 2,751,855
Patented June 26, 1956

2,751,855
RAILWAY TRUCK SPRING SUPPORT STRUCTURE

William C. Krautheim, Pasadena Park, Mo., assignor to General Steel Castings Corporation, Granite City, Ill., a corporation of Delaware Application November 7, 1952, Serial No. 319,202

12 Claims. (Cl. 105—196)

The invention relates to railway rolling stock and more particularly to railway trucks of the type in which a truck frame mounted on wheel and axle assemblies mounts in turn spring units at opposite sides of the truck which support the opposite ends of a truck bolster extending transversely of the truck and provided with a load-carrying center plate.

One main object of the invention is to provide efficient and easily operated means for vertically adjusting the height of the springs and the bolster ends to maintain proper height of the bolster center plate and requisite level disposition of the bolster. This object is attained by provision of a bolster spring seat having a portion accessible, through an opening in the spring seat support, by a jack to allow insertion of shims beneath the spring seat. The spring seat may be supported directly on the truck frame or on a spring plank suspended from the truck frame by swing hangers providing for lateral motion of the bolster relative to the truck frame.

Another object is to facilitate assembly of the truck parts, particularly a spring plank, bolster spring seats, bolster springs, bolster and truck frame with swing hangers, before the truck is placed under a vehicle body.

Another object is to provide for the replacement of a bolster spring, a bolster spring seat, or a spring plank while the truck is under the vehicle body and without substantial disassembly of parts other than those to be replaced.

These and other detail objects are attained by the structure shown in the accompanying drawings, in which:

Figure 8 is in part a top view of a portion of railway truck embodying another form of the invention and, in part, a horizontal section on line 8—8 of Figure 9.

Figure 9 is a side elevation of the structure shown in Figure 8.

Figure 10 is a vertical transverse section taken on the line 10—10 of Figure 9.

Figure 11 is a section similar to Figure 10 showing some of the truck parts in positions which may be assumed during initial assembly of the truck.

Figure 12 illustrates the connected truck and vehicle body in positions which may be assumed during replacement of a bolster spring or other truck parts.

Figure 13:
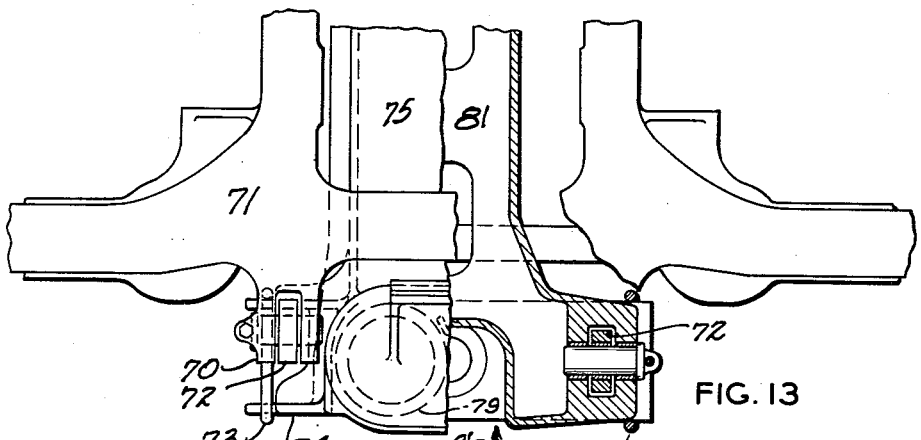
Figure 14:
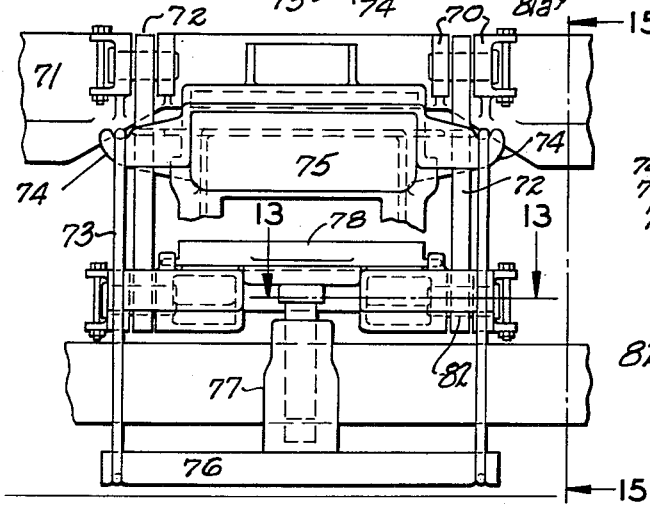

Figure 13 corresponds to Figure 8 but shows another form of the invention being, in part, a section on line 13—13 of Figure 14.

Figure 14 is a side view of the structure shown in Figure 13.

Figure 15:
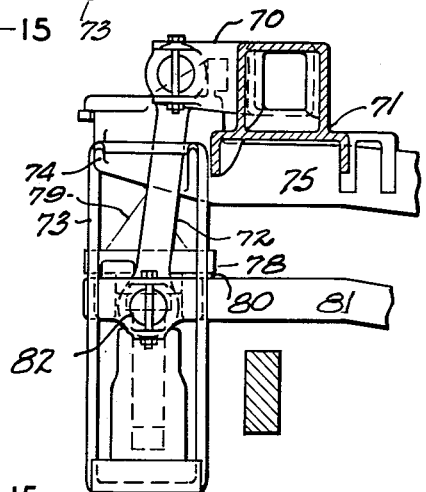

Figure 15 is a vertical transverse section taken on line 15—15 of Figure 14.

Figure 3:
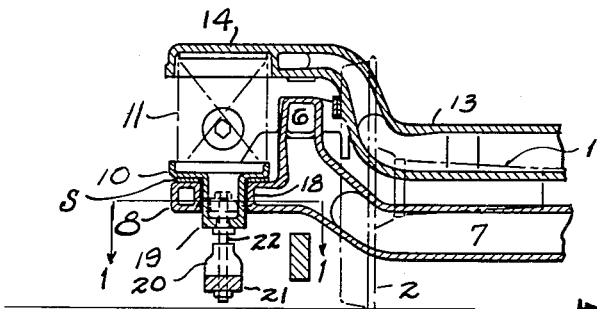
Figure 3 is a vertical transverse section taken on the line 3—3 of Figure 1.
Figure 6:
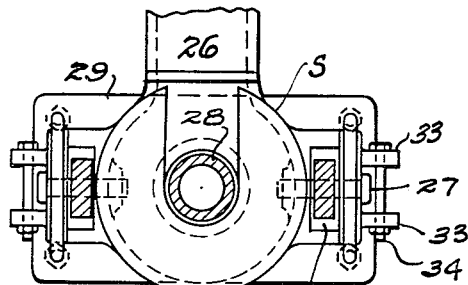
Figure 6 is a horizontal section taken on the line 6—6 of Figure 5.
Figure 4:
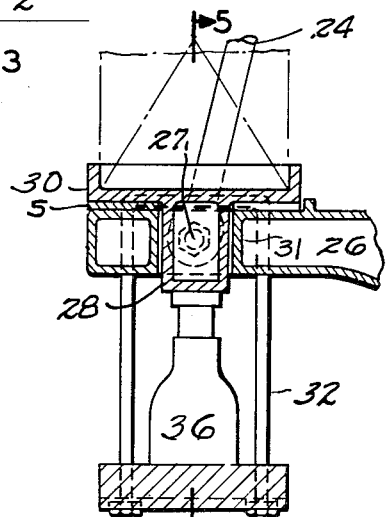
Figure 4 is a vertical transverse section illustrating another arrangement in which a bolster spring seat is mounted on a spring plank.
Figure 5:
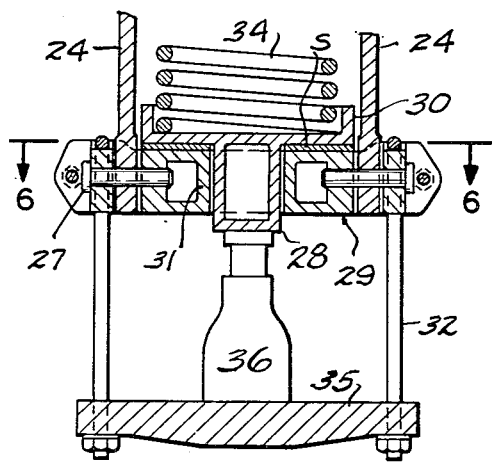
Figure 5 is a vertical transverse section taken on the line 5—5 of Figure 4.
Figure 7:
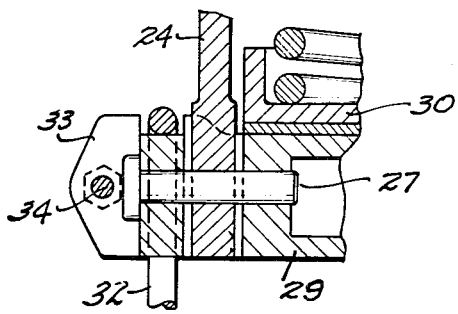
Figure 7 is an enlarged detail section of Figure 5.
Figure 16:
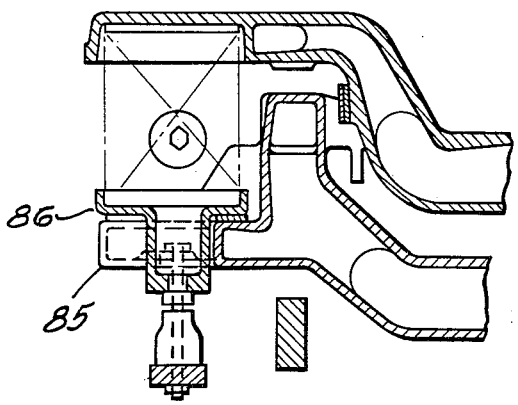

Figure 16 corresponds to Figure 3 but illustrates an alternate form of the truck frame bracket.

Figure 1:
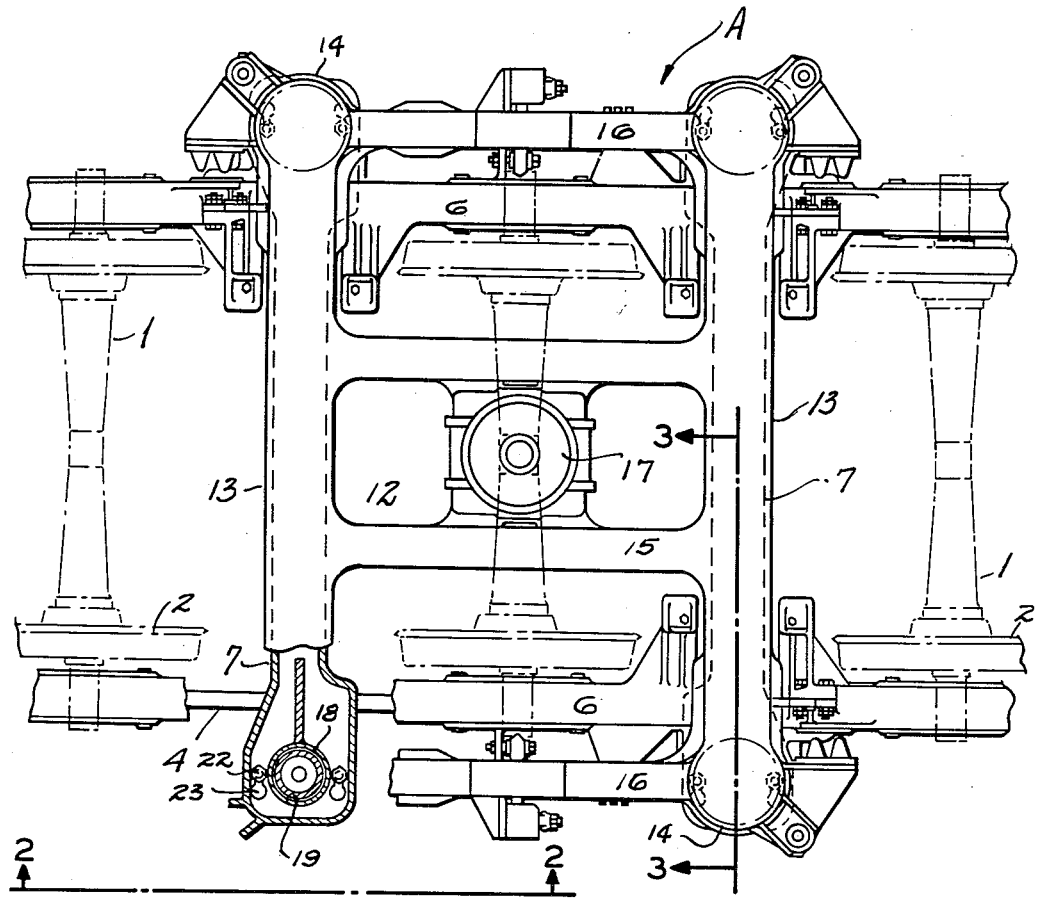
Figure 1 is a top view of the major portion of a railway truck in which the bolster spring seat is mounted directly on the truck frame, a portion of the structure being sectioned horizontally on the line 1—1 of Figure 3.
Figure 2:
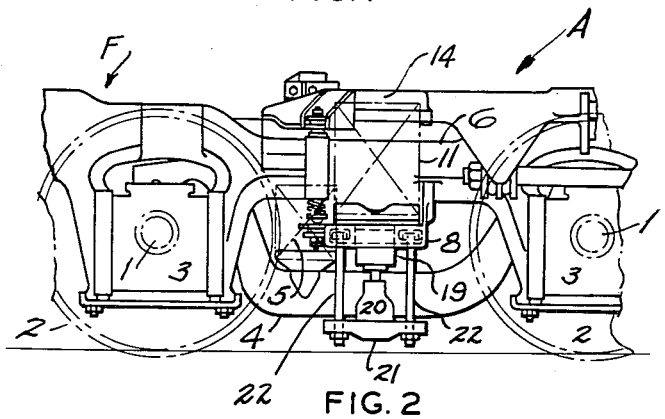
Figure 2 is a side view taken along the line 2—2 of Figure 1.

Referring to Figures 1–3, A generally designates a railway truck having spaced axles 1 with wheels 2, journal boxes 3, equalizers 4 extending between adjacent journal boxes, and equalizer springs 5. The truck frame F includes side members or wheel pieces 6 mounted on springs 5, center or intermediate transoms 7, and end transoms (not shown). Each center transom 7 is substantially below the level of side members 6 throughout the major portion of its length and is inclined upwardly at its ends to merge with side members 6 (Figure 3). Integral brackets 8 extend outwardly of the truck beyond side members 6 and well below the level thereof. Brackets 8 carry seats 10 for upright coil springs 11.

A load-carrying bolster 12 includes transverse members 13, positioned over frame transoms 7, and having their end portions extending over side members 6 and forming spring caps 14 resting upon springs 11. Bolster 12 also includes longitudinal center members 15, longitudinal side members 16 and a vehicle body-carrying center plate 17.

Preferably truck frame F and bolster 12 each comprises a one-piece casting and each of the respective main parts thereof is of box cross section to afford maximum strength for a given amount of material.

Each bracket 8 includes a centrally located upright circular web 18 for receiving a cylinder-like jacking boss projection 19 depending from the associated spring seat 10. Each projection 19 may extend downwardly a substantial distance below the related bracket 8 for contact with a jack 20, which may be carried upon a bar 21 suspended from bracket 8 by elongated links 22 passing through longitudinal slots 23 provided in bracket 8, or the jack head may project into the opening in the bracket to engage the bottom of the spring seat.

Bar 21 and links 22 form a stirrup-like or yoke-like jack carrier which is disposed outwardly of truck frame F and is readily accessible for operation, whereby spring seats 10 with spring 11, bolster 12 and the imposed load, may be raised from bracket 8 to permit the insertion of shims $s$ between the spring seats 10 and the associated bracket 8 to adjust the bolster level and to maintain the desired height of center plate 17. Each side of bolster 12 may be thus independently adjusted efficiently and quickly without requiring any steps of disassembly and reassembly of the truck structure as necessary in trucks used heretofore.

This invention may be adapted for use with railway trucks of the lateral motion bolster type, as illustrated in Figures 4 to 7 of the drawings, wherein 24 designates swing hangers pivotally suspended at their upper ends from the truck frame. At their lower ends, swing hangers 24 project into openings 25 in a spring plank 26 for supporting the same through pivot pins 27, received within openings provided on opposite sides of brackets 29 at each end of spring plank 26. The spring plank mounts a spring seat 30 and includes a central upright circular web 31 for receiving projection 28 of the spring seat to engage jack 36. The jack is mounted on a plate 35 suspended by U-links 32, swinging from bracket 29 outwardly of hangers 24.

Each bracket 29 has pairs of spaced ears 33, receiving a retainer pin 34 axially normal to the adjacent pivot pin 27 to prevent its accidental displacement. Ears 33 project above the upper surface of bracket 29 to maintain U-links 32 against lateral shifting.

Upon operation of pack 36, spring seat 30, with bolster spring 34 and the load-supporting bolster thereon (not shown) will be moved vertically with respect to spring plank 26 to allow the placement of the necessary shims s between spring plank 26 and seat 30 for effecting the indicated adjustment of the bolster.

In Figures 8–12 the truck 40 corresponds generally to the truck frame shown in Figures 1–7 and includes wheel pieces 41 supported on equalizers 42 by equalizer springs, not shown. The frame includes center transoms 43 substantially closer to each other than transoms 13 shown in Figure 1 and the bolster 44 comprises a single box-like member extending transversely of the truck and beneath side members 41. The ends of the bolster are offset upwardly of the frame side members (Figure 10) and form spring caps resting upon the upper ends of bolster springs 45.

Depending from brackets 46 on frame side members 41 are swing hangers 47 at opposite sides of bolster 44 and provided with pins 48 at their lower ends for mounting the spring plank 49 extending from side to side of the truck. Bolster spring seats 50 are carried on the ends of spring plank 49 similarly to the arrangement shown in Figures 4–7 but the spring plank is slotted inwardly from its end as indicated at 49a to accommodate the downward projection on the spring seat and provide for the insertion and removal of the spring seat laterally without requiring the spring seat to be raised from the spring plank a distance corresponding to the depth of its downward projection.

Frame brackets 46 include depending supplemental brackets 51 to which loop-like links 52 are readily applied and removed. Each pair of links 52 may carry at their lower ends a cross bar 53 on which a jack 54 may be mounted with its head 54a in position to engage and raise bolster spring seat 50, to provide for insertion or removal of shims s beneath the spring seats as described above relative to the spring seats of Figures 1–7.

Jack links 52 and the jack may be used to facilitate the original assembly of the associated truck parts before the truck is placed under the car body as follows: Cross bars 53 and jacks 54 are supported on the assembly floor as by blocks 55 (Figure 11) and spring plank 49 is supported from the assembly floor as by blocks 56. Spring seats 50 and bolster springs 45 are applied to the spring plank. Bolster 44 is then placed on the bolster springs. The trunk frame is then lowered as by an overhead crane chain 57 until it contacts the bolster when the parts will be in the position indicated in Figure 11 with the jacks retracted so as to clear the spring seats and spring plank. The jack links are then suspended from brackets 51 and swung under the ends of cross bars 53. The jack is then extended to compress the bolster springs to a height sufficient for assembly of swing hangers 47 with the spring plank. Then the spring plank is lifted manually or with suitable tools, to bring the pin holes in the lower ends of the bolster swing hangers 47 in line with the pin holes in the spring plank. Then pins 48 are inserted and the jacks retracted, whereupon the bolster, bolster springs, spring seats, and spring plank are supported from the truck frame which is suspended by the overhead crane chain 57 or by any other suitable support. The jacking device is then removed.

The wheeled axles, journal boxes and equalizers assembled as a unit are then moved under the frame-bolster assembly, the equalizer springs applied to the equalizers and the frame-bolster assembly lowered onto the equalizer springs and other details of the truck applied. The truck is then ready for assembly with the vehicle body B (Figure 12) which is lowered onto the truck and pivotally secured to it by a king pin 58.

The jacking device is also adapted to facilitate the replacement of a broken or weak spring or spring seat in a complete truck and body assembly without disassembling the truck by taking the following steps:

The vehicle body B is raised by jacks 60 (Figure 12), lifting, by a king pin 58, the truck bolster to the position shown in Figure 12 in which the top of the bolster engages the bottom of the truck frame side pieces 41. When relieved of the weight of the bolster and vehicle body, the bolster spring expands an amount equal to the normal distance between the top of the bolster and the bottom of the wheel piece. Jacks 54 are then extended to compress springs 45 slightly and relieve the pressure on pins 48 which may be removed and spring plank 49 is lowered until it rests upon equalizers 42. Jacks 54 are then retracted and the bolster springs are expanded to their free height and may be removed and replaced (also the spring seat and spring plank, if desired). Thereupon the steps may be reversed to apply swing hanger pins 48 and again support the car body on the truck bolster.

In Figures 13–15 the truck parts correspond to those shown in Figures 8–12 but brackets 70 on truck frame 71 for suspending the bolster swing hangers 72 do not have auxiliary brackets for jacking device links 73. The latter are suspended from brackets 74 on bolster 75. Cross bar 76 and jack 77 are as previously described and the jack may be extended to engage spring seat 78 and compress bolster spring 79 to provide for insertion of shims 80 between its spring seat and spring plank 81 or to relieve spring plank swing hanger pins 82 of their load and facilitate their withdrawal for manipulation as described in connection with the structure of Figures 8–12, both as to original assembly of the truck and as to later body and truck operations. As in the structure of Figures 7–12, the spring plank is recessed inwardly from its outer end as indicated at 81a to accommodate the lateral application and removal of spring seat 78 without raising its lower part above the level of the spring plank.

Figure 16 corresponds generally to Figure 3 but shows the truck frame bracket 85 slotted inwardly from its outer end, as are the spring planks in Figures 8–15, to accommodate the lateral application of spring seat 86 without raising the entire seat above the level of the spring plank as is required in the structure of Figure 3.

The details of construction may be varied substantially other than as indicated above without departing from the spirit of the invention and the exclusive use of those modifications coming within the scope of the claims is contemplated.

What is claimed is:

1. In a railway truck comprising spaced wheel and axle assemblies and a structure carried thereby, including a spring seat mounting, a spring seat on said mounting, a spring unit on said spring seat, and a load-carrying bolster having an end portion mounted on said spring unit, there being a vertical opening in said mounting below the spring seat providing access from below the mounting to that portion of the spring seat exposed by the opening, there being bearings on said structure positioned at opposite sides of the spring seat and arranged to detachably mount lifting device support elements extending downwardly therefrom and beneath the opening in the spring seat mounting.

2. In a railway truck comprising spaced wheel and axle assemblies and structure carried thereby including a truck frame, hangers pivotally suspended from said frame to swing transversely of the truck, a spring plank carried on said hangers, there being a vertical opening therethrough near each end thereof, a spring seat mounted on each end of said spring plank, springs on said spring seats, and a load-carrying bolster mounted on said springs, each spring seat including a portion projecting downwardly through said opening and below said spring plank for engagement by a lifting device below the spring plank.

3. A railway truck frame comprising wheel pieces, transverse transoms substantially below the level of said wheel pieces and terminating in brackets spaced outwardly of the frame beyond said wheel pieces, there being upward extensions from said transoms and brackets merging with said wheel pieces, said brackets being of box-like cross section and each having an upright, centrally disposed, circular web forming a passage extending through the top and bottom walls of the bracket and adapted to receive a relatively movable spring seat device inserted from above the bracket.

4. A railway truck comprising a frame having central transoms, a bracket at each end of each of said transoms, each bracket having a centrally located vertical opening, a spring seat carried on each bracket and having a portion extending downwardly through the opening therein, a spring mounted on each spring seat, and a load-carrying bolster having spaced transverse arms supported by said springs, each spring seat, with the adjacent spring and bolster, being movable upwardly with respect to the associated bracket to permit the insertion of shims therebetween in order to present the bolster in desired adjusted position.

5. A railway truck frame comprising side members and spaced transverse members extending between and projecting outwardly beyond said side members and forming individual brackets for bolster spring seats, each of said brackets having an upright opening from top to bottom of the bracket for accommodating a downwardly projecting jacking boss on an individual bolster spring seat carried by the bracket.

6. A railway truck frame as described in claim 5, in which each bracket is of box-like cross section including top and bottom walls, and the upright opening is formed by a circular web disposed centrally of the bracket with its ends merging with the top and bottom walls of the bracket.

7. In a railway truck comprising spaced wheel and axle assemblies and structure carried thereby including a truck frame, hangers pivotally suspended from said frame to swing transversely of the truck, a spring plank carried on said hangers, a spring seat mounted on each end of said spring plank, springs on said spring seats, and a load-carrying bolster mounted on said springs, there being an opening in said spring plank directly below the spring seat providing for engagement of that portion of the spring seat surrounded by the periphery of the opening by a lifting device positioned below the spring plank.

8. In a railway truck comprising spaced wheel and axle assemblies and structure carried thereby including a truck frame, hangers pivotally suspended from said frame to swing transversely of the truck, a spring plank carried on said hangers, and provided with a recess extending inwardly from its outer end, a spring seat having a spring supporting part overlying said spring plank at the sides of said recess, there being a downward projection from said part extending into said recess and movable lengthwise of the spring plank through the open end of said recess.

9. In a railway truck comprising spaced wheel and axle assemblies and structure carried thereby including a truck frame having an upwardly facing bracket extending outwardly of the truck and recessed inwardly from its outer end, a spring seat having a spring supporting part overlying said bracket at the sides of said recess, there being a downward projection from said part extending into said recess and movable lengthwise of the bracket through the open end of said recess.

10. In a railway truck with wheeled axles and structure carried thereby including a truck frame and a spring plank suspended therefrom, with a vertical recess near its end, and a spring seat mounted on the spring plank, with a downwardly exposed portion at said recess, and a spring carried on said seat and a bolster carried on said spring, said spring plank having bearings at opposite sides of said opening arranged to detachably mount lifting device support elements extending downwardly therefrom and beneath the spring seat, said structure providing unobstructed access to the bottom of said spring seat.

11. In a railway truck with wheeled axles and structure carried thereby including a truck frame and a spring seat supported therefrom, with a downwardly exposed portion, and a bolster spring on said seat and a load-carrying bolster mounted on said spring, said frame having bearings at the sides of said bolster arranged to detachably mounted lifting device support elements extending downwardly therefrom and beneath the spring seat, said structure providing unobstructed access to the bottom of said spring seat.

12. In a railway truck with wheeled axles and structure carried thereby including a truck frame, a spring seat supported from said frame and a coil spring mounted on said seat and a bolster mounted on said spring, said bolster being provided with bearings at opposite sides of said spring arranged to detachably mounted lifting device support elements extending downwardly therefrom and beneath the spring seat, said structure providing unobstructed access to the bottom of said spring seat.

References Cited in the file of this patent

UNITED STATES PATENTS

| | | |
|---|---|---|
| 798,776 | Freet | Sept. 5, 1905 |
| 1,475,178 | Floyd | Nov. 27, 1923 |
| 1,494,564 | Piasecki | May 20, 1924 |
| 2,044,971 | Clasen | June 23, 1936 |
| 2,189,977 | Donop | Feb. 13, 1940 |
| 2,241,418 | Nystrom | May 13, 1941 |
| 2,467,332 | Monteith | Apr. 12, 1949 |
| 2,523,375 | Jones | Sept. 26, 1950 |
| 2,573,232 | Travilla | Oct. 30, 1951 |